US012652618B2

(12) United States Patent
He

(10) Patent No.: US 12,652,618 B2
(45) Date of Patent: Jun. 9, 2026

(54) TECHNIQUES FOR WAKEUP SIGNALING FOR DISCONTINUOUS RECEPTION GROUPS

(71) Applicant: QUALCOMM Incorporated, San Diego, CA (US)

(72) Inventor: Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 985 days.

(21) Appl. No.: 17/806,870

(22) Filed: Jun. 14, 2022

(65) Prior Publication Data

US 2023/0036099 A1 Feb. 2, 2023

Related U.S. Application Data

(60) Provisional application No. 63/203,782, filed on Jul. 30, 2021.

(51) Int. Cl.
*H04W 80/02* (2009.01)
*H04W 52/02* (2009.01)

(52) U.S. Cl.
CPC ... *H04W 52/0232* (2013.01); *H04W 52/0274* (2013.01); *H04W 80/02* (2013.01)

(58) Field of Classification Search
CPC ......... H04W 52/0232; H04W 52/0274; H04W 80/02; Y02D 30/70
USPC ........................................................ 370/318
See application file for complete search history.

(56) References Cited

U.S. PATENT DOCUMENTS

| | | | | |
|---|---|---|---|---|
| 12,250,632 | B2 * | 3/2025 | Murray | H04W 72/23 |
| 2013/0163497 | A1 * | 6/2013 | Wei | H04L 5/001 |
| | | | | 370/311 |
| 2017/0264400 | A1 * | 9/2017 | Nigam | H04W 76/28 |
| 2019/0150114 | A1 * | 5/2019 | Liu | H04W 48/16 |
| | | | | 370/252 |
| 2020/0045768 | A1 * | 2/2020 | He | H04W 76/28 |
| 2020/0053645 | A1 * | 2/2020 | Charbit | H04W 68/005 |
| 2021/0051698 | A1 * | 2/2021 | Tsai | H04W 72/23 |
| 2021/0136689 | A1 * | 5/2021 | Kim | H04W 24/08 |
| 2022/0086761 | A1 * | 3/2022 | Maleki | H04W 52/0235 |
| 2023/0063026 | A1 * | 3/2023 | Reial | H04W 52/0235 |
| 2025/0309969 | A1 * | 10/2025 | Kwon | H04W 52/0216 |

OTHER PUBLICATIONS

International Search Report and Written Opinion—PCT/US2022/073880—ISA/EPO—Nov. 8, 2022.

* cited by examiner

*Primary Examiner* — Jinsong Hu
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive first information indicating a first discontinuous reception (DRX) configuration for a first group of cells and second information indicating a second DRX configuration for a second group of cells. The UE may receive third information configuring a wakeup signal (WUS) for the UE. The UE may receive fourth information indicating that the WUS applies to a set of groups of cells selected from the first group of cells and the second group of cells. The UE may receive the WUS based at least in part on the third information. Numerous other aspects are described.

30 Claims, 12 Drawing Sheets

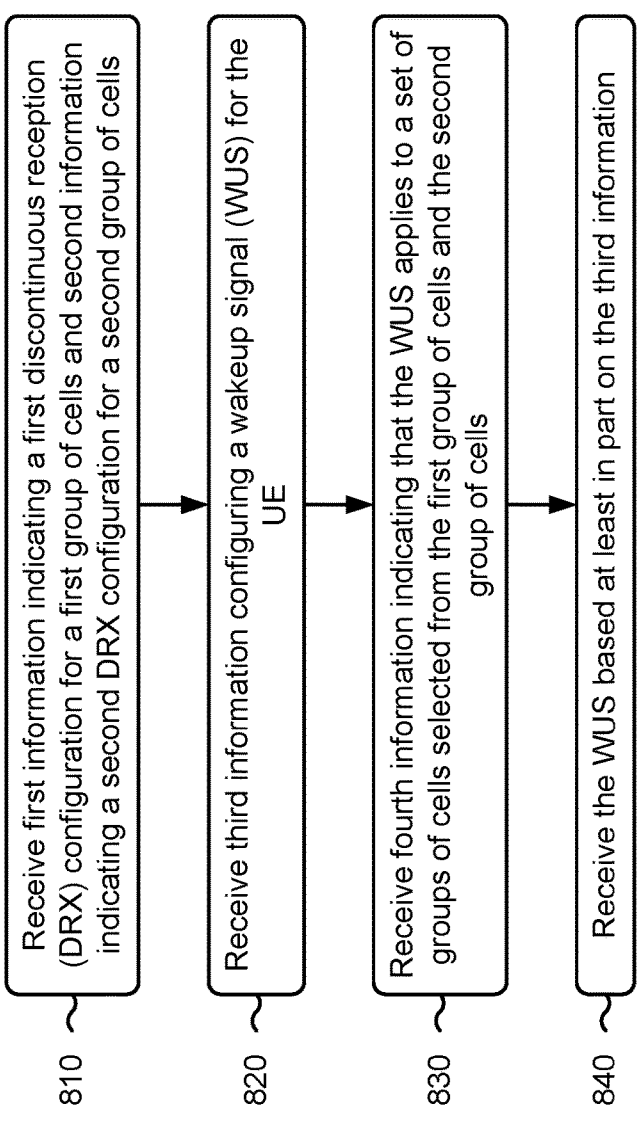

810 — Receive first information indicating a first discontinuous reception (DRX) configuration for a first group of cells and second information indicating a second DRX configuration for a second group of cells 820 — Receive third information configuring a wakeup signal (WUS) for the UE 830 — Receive fourth information indicating that the WUS applies to a set of groups of cells selected from the first group of cells and the second group of cells 840 — Receive the WUS based at least in part on the third information

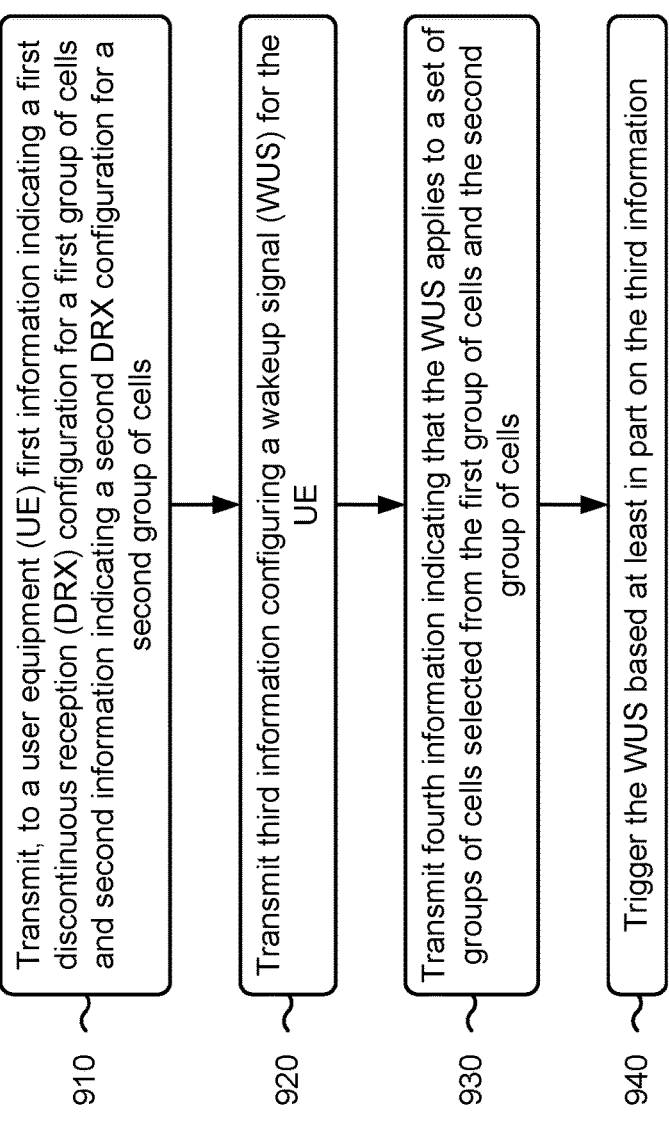

910 Transmit, to a user equipment (UE) first information indicating a first discontinuous reception (DRX) configuration for a first group of cells and second information indicating a second DRX configuration for a second group of cells 920 Transmit third information configuring a wakeup signal (WUS) for the UE 930 Transmit fourth information indicating that the WUS applies to a set of groups of cells selected from the first group of cells and the second group of cells 940 Trigger the WUS based at least in part on the third information

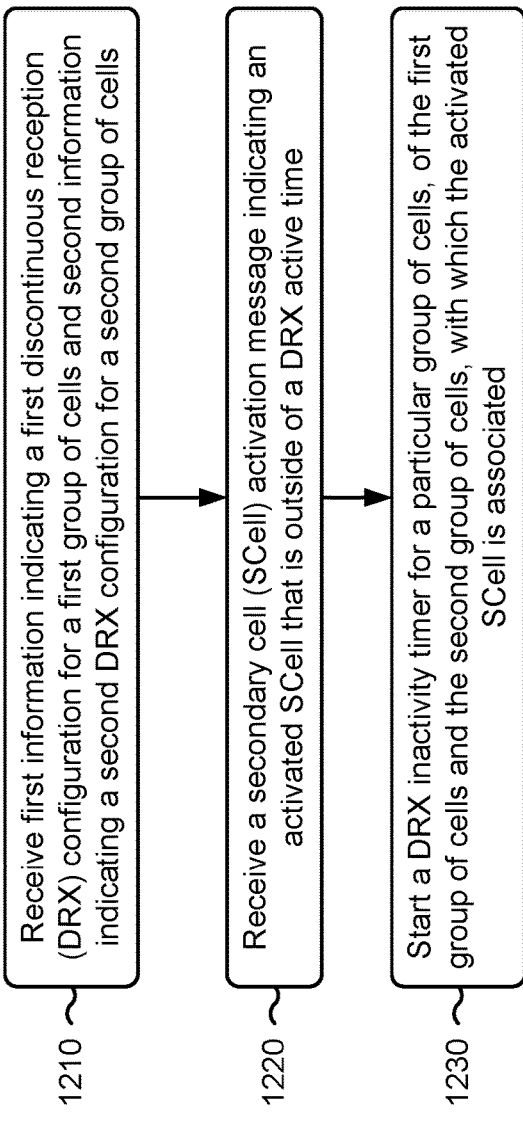

1210   Receive first information indicating a first discontinuous reception (DRX) configuration for a first group of cells and second information indicating a second DRX configuration for a second group of cells 1220   Receive a secondary cell (SCell) activation message indicating an activated SCell that is outside of a DRX active time 1230   Start a DRX inactivity timer for a particular group of cells, of the first group of cells and the second group of cells, with which the activated SCell is associated

TECHNIQUES FOR WAKEUP SIGNALING FOR DISCONTINUOUS RECEPTION GROUPS

CROSS-REFERENCE TO RELATED APPLICATION

This Patent Application claims priority to U.S. Provisional Patent Application No. 63/203,782, filed on Jul. 30, 2021, entitled "TECHNIQUES FOR WAKEUP SIGNALING FOR DISCONTINUOUS RECEPTION GROUPS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for wakeup signaling for discontinuous reception (DRX) groups.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving first information indicating a first discontinuous reception (DRX) configuration for a first group of cells and second information indicating a second DRX configuration for a second group of cells. The method may include receiving third information configuring a wakeup signal (WUS) for the UE. The method may include receiving fourth information indicating that the WUS applies to a set of groups of cells selected from the first group of cells and the second group of cells. The method may include receiving the WUS based at least in part on the third information.

Some aspects described herein relate to a method of wireless communication performed by a base station. The method may include transmitting, to a UE first information indicating a first DRX configuration for a first group of cells and second information indicating a second DRX configuration for a second group of cells. The method may include transmitting third information configuring a WUS for the UE. The method may include transmitting fourth information indicating that the WUS applies to a set of groups of cells selected from the first group of cells and the second group of cells. The method may include transmitting the WUS based at least in part on the third information.

Some aspects described herein relate to an apparatus for wireless communication at a UE. The apparatus may include a memory. The apparatus may include one or more processors, coupled to the memory, configured to receive first information indicating a first DRX configuration for a first group of cells and second information indicating a second DRX configuration for a second group of cells receive; third information configuring a WUS for the UE; receive fourth information indicating that the WUS applies to a set of groups of cells selected from the first group of cells and the second group of cells; and receive the WUS based at least in part on the third information.

Some aspects described herein relate to an apparatus for wireless communication at a base station. The apparatus may include a memory. The apparatus may include one or more processors, coupled to the memory, configured to transmit, to a UE first information indicating a first DRX configuration for a first group of cells and second information indicating a second DRX configuration for a second group of cells; transmit third information configuring a WUS for the UE; transmit fourth information indicating that the WUS applies to a set of groups of cells selected from the first group of cells and the second group of cells; and transmit the WUS based at least in part on the third information.

Some aspects described herein relate to a non-transitory computer-readable medium that stores a set of instructions for wireless communication by a UE. The set of instructions, when executed by one or more processors of the UE, may cause the UE to receive first information indicating a first DRX configuration for a first group of cells and second information indicating a second DRX configuration for a second group of cells. The set of instructions, when executed by one or more processors of the UE, may cause the UE to receive third information configuring a WUS for the UE. The set of instructions, when executed by one or more processors of the UE, may cause the UE to receive fourth information indicating that the WUS applies to a set of groups of cells selected from the first group of cells and the second group of cells. The set of instructions, when executed by one or more processors of the UE, may cause the UE to receive the WUS based at least in part on the third information.

Some aspects described herein relate to a non-transitory computer-readable medium that stores a set of instructions for wireless communication by a base station. The set of instructions, when executed by one or more processors of the base station, may cause the base station to transmit, to a UE first information indicating a first DRX configuration for a first group of cells and second information indicating a second DRX configuration for a second group of cells. The set of instructions, when executed by one or more processors of the base station, may cause the base station to transmit third information configuring a WUS for the UE. The set of instructions, when executed by one or more processors of the base station, may cause the base station to transmit fourth information indicating that the WUS applies to a set of groups of cells selected from the first group of cells and the second group of cells. The set of instructions, when executed by one or more processors of the base station, may cause the base station to transmit the WUS based at least in part on the third information.

Some aspects described herein relate to an apparatus for wireless communication. The apparatus may include means for receiving first information indicating a first DRX configuration for a first group of cells and second information indicating a second DRX configuration for a second group of cells. The apparatus may include means for receiving third information configuring a WUS for the UE. The apparatus may include means for receiving fourth information indicating that the WUS applies to a set of groups of cells selected from the first group of cells and the second group of cells. The apparatus may include means for receiving the WUS based at least in part on the third information.

Some aspects described herein relate to an apparatus for wireless communication. The apparatus may include means for transmitting, to a UE first information indicating a first DRX configuration for a first group of cells and second information indicating a second DRX configuration for a second group of cells. The apparatus may include means for transmitting third information configuring a WUS for the UE. The apparatus may include means for transmitting fourth information indicating that the WUS applies to a set of groups of cells selected from the first group of cells and the second group of cells. The apparatus may include means for transmitting the WUS based at least in part on the third information.

Some aspects described herein relate to a method of wireless communication performed by a UE. The method may include receiving first information indicating a first DRX configuration for a first group of cells and second information indicating a second DRX configuration for a second group of cells. The method may include receiving third information configuring a WUS for the UE. The method may include receiving a secondary cell (SCell) activation message indicating an activated SCell that is outside of a DRX active time. The method may include starting a DRX inactivity timer for a particular group of cells, of the first group of cells and the second group of cells, with which the activated SCell is associated.

Some aspects described herein relate to an apparatus for wireless communication at a UE. The apparatus may include a memory. The apparatus may include one or more processors, coupled to the memory, configured to receive first information indicating a first DRX configuration for a first group of cells and second information indicating a second DRX configuration for a second group of cells; receive third information configuring a WUS for the UE; receive an SCell activation message indicating an activated SCell that is outside of a DRX active time; and start a DRX inactivity timer for a particular group of cells, of the first group of cells and the second group of cells, with which the activated SCell is associated.

Some aspects described herein relate to a non-transitory computer-readable medium that stores a set of instructions for wireless communication by a UE. The set of instructions, when executed by one or more processors of the UE, may cause the UE to receive first information indicating a first DRX configuration for a first group of cells and second information indicating a second DRX configuration for a second group of cells. The set of instructions, when executed by one or more processors of the UE, may cause the UE to receive third information configuring a WUS for the UE. The set of instructions, when executed by one or more processors of the UE, may cause the UE to receive an SCell activation message indicating an activated SCell that is outside of a DRX active time. The set of instructions, when executed by one or more processors of the UE, may cause the UE to start a DRX inactivity timer for a particular group of cells, of the first group of cells and the second group of cells, with which the activated SCell is associated.

Some aspects described herein relate to an apparatus for wireless communication. The apparatus may include means for receiving first information indicating a first DRX configuration for a first group of cells and second information indicating a second DRX configuration for a second group of cells. The apparatus may include means for receiving third information configuring a WUS for the UE. The apparatus may include means for receiving an SCell activation message indicating an activated SCell that is outside of a DRX active time. The apparatus may include means for starting a DRX inactivity timer for a particular group of cells, of the first group of cells and the second group of cells, with which the activated SCell is associated.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8 and 9 are diagrams illustrating example processes associated with mapping a WUS to one or more DRX groups, in accordance with the present disclosure.

FIG. 12 is a diagram illustrating an example process associated with mapping a WUS to one or more DRX groups, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
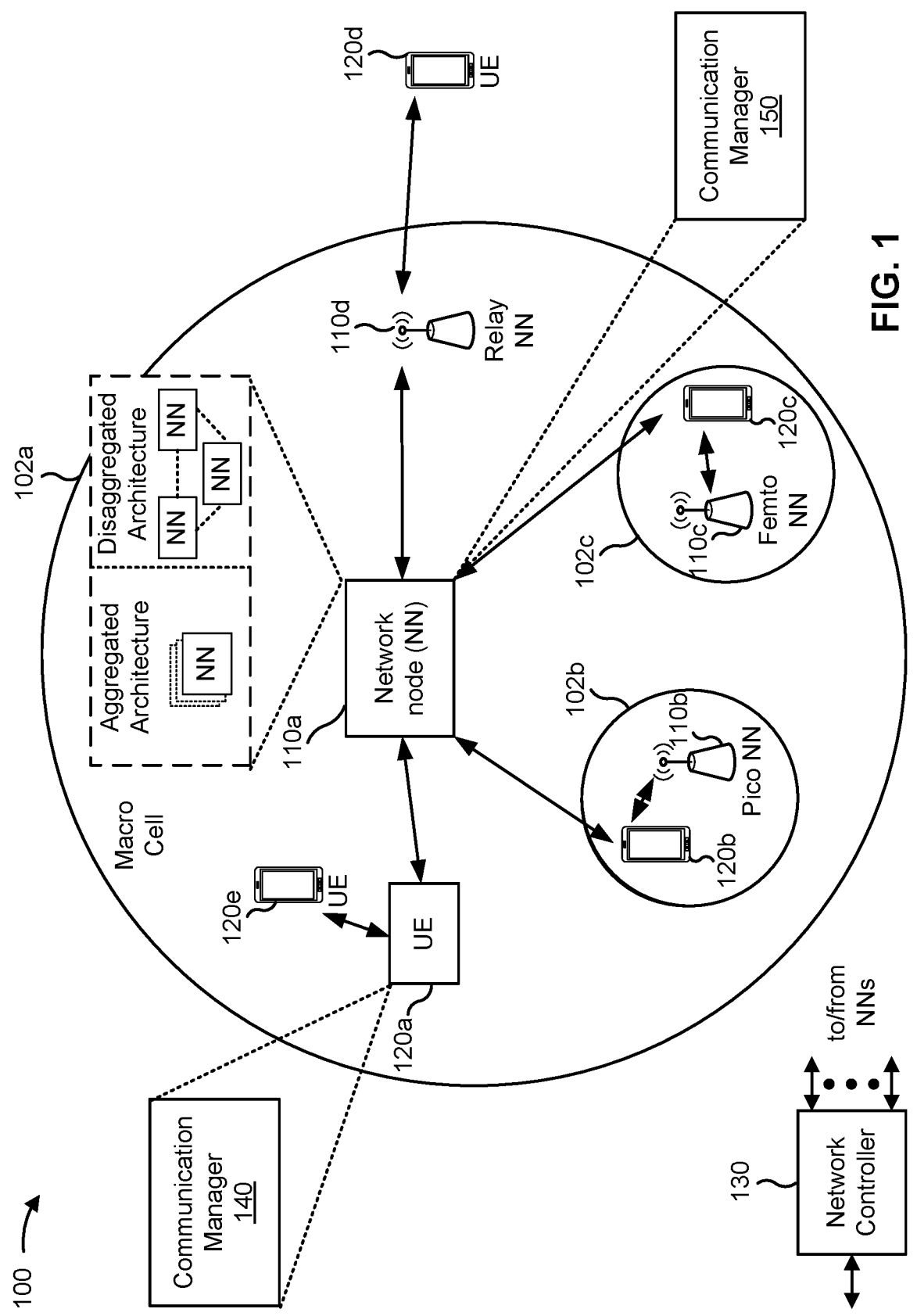
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), or other entities. A network node 110 is an example of a network entity that communicates with UEs 120. As shown, a network node 110 may include one or more network entities. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 includes two or more non-co-located network nodes. A disaggregated network entity may be configured to utilize a protocol stack that is physically or logically distributed among two or more nodes (such as one or more central units (CUs), one or more distributed units (DUs), or one or more radio units (RUs)).

In some examples, a network node 110 includes an entity that communicates with UEs 120 via a radio access link, such as an RU. In some examples, a network node 110 includes an entity that communicates with other network nodes 110 via a fronthaul link or a midhaul link, such as a DU. In some examples, a network node 110 includes an entity that communicates with other network nodes 110 via a midhaul link or a core network via a backhaul link, such as a CU. In some examples, a network node 110 (such as an aggregated network node 110 or a disaggregated network node 110) may include multiple network entities, such as one or more RUs, one or more CUs, or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network entity subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network entity. A network node 110 for a pico cell may be referred to as a pico network entity. A network node 110 for a femto cell may be referred to as a femto network entity or an in-home network entity. In the example shown in FIG. 1, the network node 110a may be a macro network entity for a macro cell 102a, the network node 110b may be a pico network entity for a pico cell 102b, and the network node 110c may be a femto network entity for a femto cell 102c. A network entity may support one or multiple (for example, three) cells. In some examples, a cell may not necessarily be stationary, and the geographic area of the cell may move according to the location of a network node 110 that is mobile (for example, a mobile network entity).

In some aspects, the term "base station" or "network entity" may refer to an aggregated base station, a disaggregated base station, an integrated access and backhaul (IAB) node, a relay node, or one or more components thereof. For example, in some aspects, "base station" or "network entity" may refer to a CU, a DU, an RU, a Near-Real Time (Near-RT) RAN Intelligent Controller (MC), or a Non-Real Time (Non-RT) MC, or a combination thereof. In some aspects, the term "base station" or "network entity" may refer to one device configured to perform one or more functions, such as those described herein in connection with the network node 110. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network entity) may communicate with the network node 110a (for example, a macro network entity) and the UE 120d in order to facilitate communication between the network node 110a and the UE 120d. A network node 110 that relays communications may be referred to as a relay station, a relay base station, a relay network entity, a relay node, or a relay, among other examples.

The wireless network 100 may be a heterogeneous network that includes network nodes 110 of different types, such as macro network entities, pico network entities, femto network entities, or relay network entities. These different types of network nodes 110 may have different transmit power levels, different coverage areas, or different impacts on interference in the wireless network 100. For example, macro network entities may have a high transmit power level (for example, 5 to 40 watts) whereas pico network entities, femto network entities, and relay network entities may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network entity, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

In some aspects, the UE 120 may include a communication manager 140. As described in more detail elsewhere herein, the communication manager 140 may receive first information indicating a first discontinuous reception (DRX) configuration for a first group of cells and second information indicating a second DRX configuration for a second group of cells; receive third information configuring a wakeup signal (WUS) for the UE; receive fourth information indicating that the WUS applies to a set of groups of cells selected from the first group of cells and the second group of cells; and receive the WUS based at least in part on the third information. Additionally, or alternatively, the communication manager 140 may perform one or more other operations described herein.

In some aspects, the network node 110 may include a communication manager 150. As described in more detail elsewhere herein, the communication manager 150 may transmit to a UE first information indicating a first DRX configuration for a first group of cells and second information indicating a second DRX configuration for a second group of cells; transmit third information configuring a WUS for the UE; transmit fourth information indicating that the WUS applies to a set of groups of cells selected from the first group of cells and the second group of cells; and trigger the WUS based at least in part on the third information. Additionally, or alternatively, the communication manager 150 may perform one or more other operations described herein.

In some aspects, the UE 120 may include a communication manager 140. As described in more detail elsewhere herein, the communication manager 140 may receive first information indicating a first DRX configuration for a first group of cells and second information indicating a second DRX configuration for a second group of cells; receive a secondary cell (SCell) activation message indicating an activated SCell that is outside of a DRX active time; and start a DRX inactivity timer for a particular group of cells, of the first group of cells and the second group of cells, with which the activated SCell is associated. Additionally, or alternatively, the communication manager 140 may perform one or more other operations described herein.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
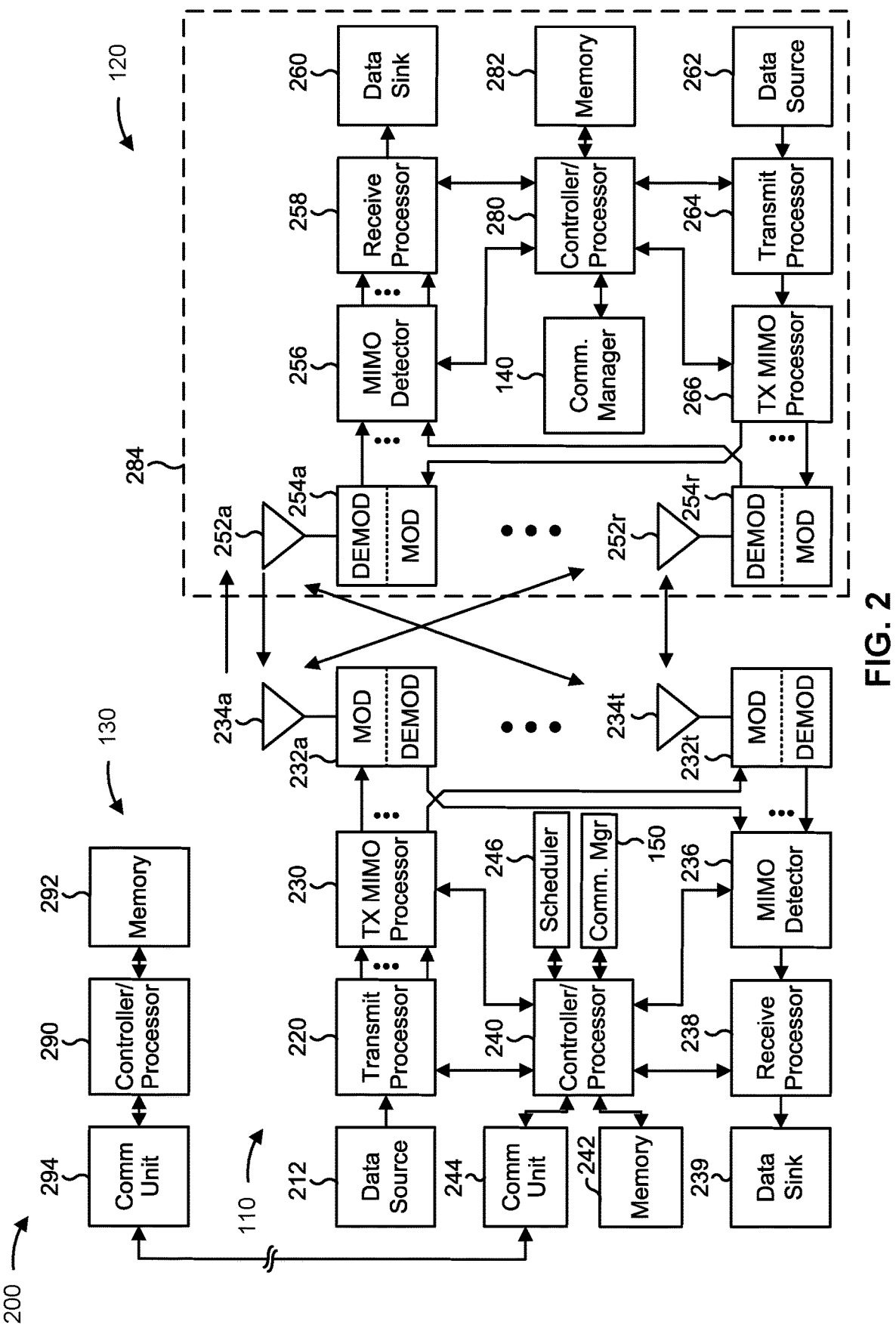
FIG. 2 is a diagram illustrating an example of a base station in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network entity. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the network node 110, the controller/processor 280 of the UE 120, and/or any other component(s) of FIG. 2 may perform one or more techniques associated with DRX grouping for a WUS, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for receiving first information indicating a first DRX configuration for a first group of cells and second information indicating a second DRX configuration for a second group of cells; means for receiving third information configuring a WUS for the UE; means for receiving fourth information indicating that the WUS applies to a set of groups of cells selected from the first group of cells and the second group of cells; and/or means for receiving the WUS based at least in part on the third information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE first information indicating a first DRX configuration for a first group of cells and second information indicating a second DRX configuration for a second group of cells; means for transmitting third information configuring a WUS for the UE; means for transmitting fourth information indicating that the WUS applies to a set of groups of cells selected from the first group of cells and the second group of cells; and/or means for transmitting the WUS based at least in part on the third information. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

DRX is a configuration in which a UE may switch between a DRX active time (in which the UE is in active communication with or monitors a physical downlink control channel from a network) and a DRX inactive time (in which the UE is not in active communication with or does not monitor a physical downlink control channel from the network). The UE may periodically wake up during a DRX on duration to monitor (e.g., on a physical downlink control channel (PDCCH)) for an indication to switch from the DRX inactive time to the DRX active time. When the UE wakes up during the DRX on duration, the UE may power on an associated modem and/or other components to perform the monitoring.

Some networks may further use wake-up signaling, in which a WUS can be transmitted to indicate to the UE whether the UE is to wake-up and monitor for the indication to switch from the DRX inactive time to the DRX active time. The UE may use a relatively simple circuit to process the WUS, rather than powering on the associated modem and/or other components.

Some UEs may be configured to use two or more DRX groups to communicate with one or more base stations of a network. A DRX group may be composed of a group of cells (e.g., one or more cells), such as a group of cells of a carrier aggregation (CA) configuration. For example, the UE may use a first DRX group having one or more cells that operate in low-band or mid-band frequencies and may use a second DRX group having one or more cells that operate in high-band (e.g., millimeter wave (mmWave)) frequencies. Different DRX parameters can be configured for different carriers. For example, the first DRX group may be configured with a shorter DRX on duration and a shorter DRX inactivity timer than the second DRX group. In some cases, different DRX groups can have a common start time to maximize power saving.

If multiple DRX groups are configured with different DRX parameters, and if wake-up signaling is configured, it may be unclear whether a WUS applies to a first DRX group, a second DRX group, or both. It may be difficult or impractical, or may involve increased overhead, to modify the WUS (for example, the waveform of the WUS or the information carried by the WUS) to communicate a DRX group to which the WUS applies. If there is ambiguity with regard to the DRX group to which a WUS applies, then a WUS may be mistakenly interpreted as applying to a particular DRX group, or may be disregarded for a DRX group to which the WUS is intended to apply. Applying a WUS to an improper DRX group may lead to UE power consumption in connection with unnecessarily entering a DRX on duration, and disregarding a WUS may lead to missed downlink communications, reference signal measurements, and so on.

Some techniques and apparatuses described herein provide configuration of a UE to indicate one or more DRX groups to which a WUS applies. For example, a UE may receive configuration information indicating whether a WUS applies to a first DRX group, a second DRX group, or both. The UE may receive a WUS, and may enter a DRX active time (e.g., a DRX on duration) for the one or more DRX groups to which the WUS is configured to apply. Thus, compatibility between the WUS and DRX groups is provided, which reduces power consumption and missed communications that would otherwise occur if compatibility between the WUS and DRX group configuration is not provided. Furthermore, some techniques and apparatuses described herein provide for subsequent activation of an inactive DRX group (e.g., after a WUS is received that is mapped to an active DRX group), such as using an SCell activation medium access control (MAC) control element (MAC-CE), which improves flexibility of WUS signaling and DRX configuration. Still further, some techniques and apparatuses described herein provide for activation of one or more DRX groups in connection with uplink transmissions, such as scheduling request transmission or random access channel (RACH) transmission, which provides power savings for uplink transmissions relative to activating all DRX groups for uplink transmission.

Figure 3:
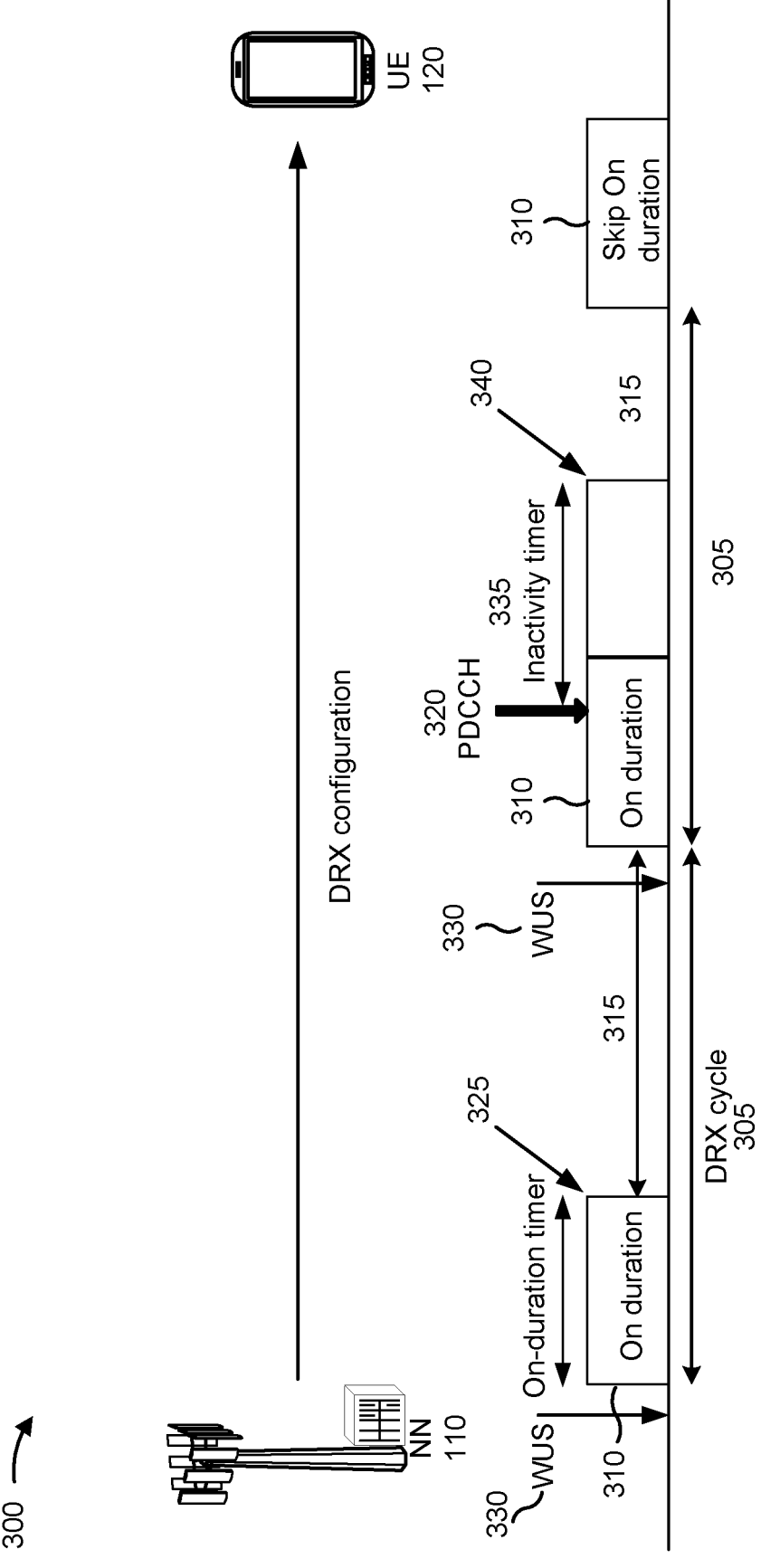
FIG. 3 is a diagram illustrating an example of a single discontinuous reception (DRX) configuration incorporating wakeup signaling, in accordance with the present disclosure.

FIG. 3 is a diagram illustrating an example 300 of a single DRX configuration incorporating wakeup signaling, in accordance with the present disclosure.

As shown in FIG. 3, a network node 110 may transmit a DRX configuration to a UE 120 to configure a DRX cycle 305 for the UE 120. For example, the DRX configuration may be conveyed via first information or via second information, as described in more detail elsewhere herein. In some aspects, the DRX configuration may pertain to a group of cells referred to herein as a DRX group. A DRX cycle 305 may include a DRX on duration 310 (e.g., during which a UE 120 is awake or in an active state) and an opportunity to enter a DRX sleep state 315. As used herein, the time during which the UE 120 is configured to be in an active state during the DRX on duration 310 may be referred to as an active time, and the time during which the UE 120 is configured to be in the DRX sleep state 315 may be referred to as an inactive time. As described below, the UE 120 may monitor a PDCCH during the active time, and may refrain from monitoring the PDCCH during the inactive time.

During the DRX on duration 310 (e.g., the active time), the UE 120 may monitor a downlink control channel (e.g., a PDCCH), as shown by reference number 320. For example, the UE 120 may monitor the PDCCH for downlink control information (DCI) pertaining to the UE 120. If the UE 120 does not detect and/or successfully decode any PDCCH communications intended for the UE 120 during the DRX on duration 310, then the UE 120 may enter the sleep state 315 (e.g., for the inactive time) at the end of the DRX on duration 310, as shown by reference number 325. In this way, the UE 120 may conserve battery power and reduce power consumption. As shown, the DRX cycle 305 may repeat with a configured periodicity according to the DRX configuration.

As shown, the UE 120 may enter DRX on durations 310 based at least in part on whether a WUS 330 is received. For example, a WUS 330 may indicate whether or not to enter a DRX on duration 310. In some cases, the absence of a WUS may indicate that the UE 120 should skip a DRX on duration 310. In some cases, a WUS may carry information indicating whether or not a UE 120 should skip a DRX on duration. After receiving a WUS, the UE 120 may enter the DRX on duration for the configured length of the DRX on duration.

If the UE 120 detects and/or successfully decodes a PDCCH communication intended for the UE 120, then the UE 120 may remain in an active state (e.g., awake) for the duration of a DRX inactivity timer 335 (e.g., which may extend the active time). The UE 120 may start the DRX inactivity timer 335 at a time at which the PDCCH communication is received (e.g., in a transmission time interval (TTI) in which the PDCCH communication is received, such as a slot or a subframe). The UE 120 may remain in the active state until the DRX inactivity timer 335 expires, at which time the UE 120 may enter the sleep state 315 (e.g., for the inactive time), as shown by reference number 340. During the duration of the DRX inactivity timer 335, the UE 120 may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The UE 120 may restart the DRX inactivity timer 335 after each detection of a PDCCH communication for the UE 120 for an initial transmission (e.g., but not for a retransmission). By operating in this manner, the UE 120 may conserve battery power and reduce power consumption by entering the sleep state 315.

As indicated above, FIG. 3 is provided as an example. Other examples may differ from what is described with respect to FIG. 3.

Figure 4:
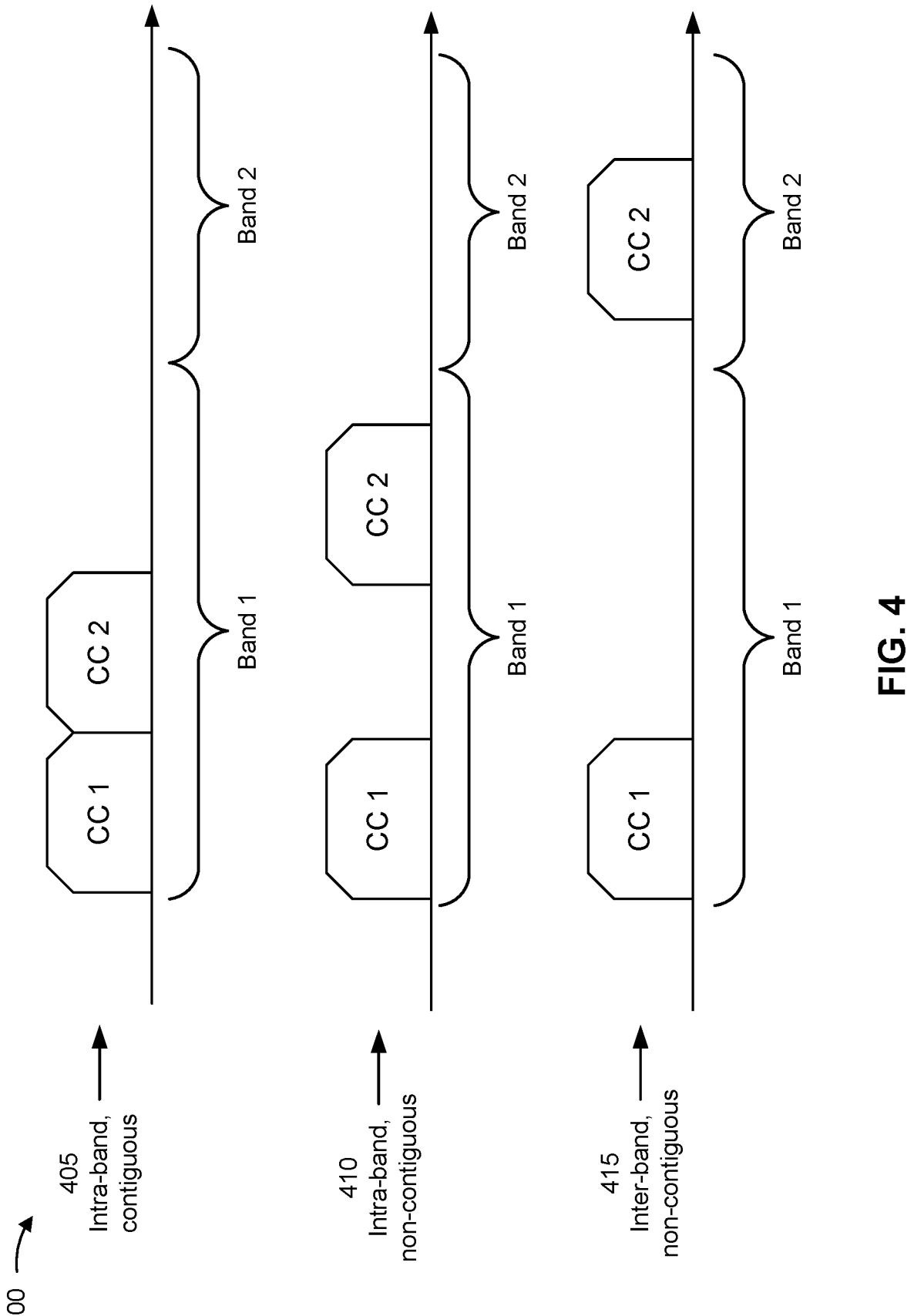
FIG. 4 is a diagram illustrating examples of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in a radio resource control (RRC) message, DCI, and/or another signaling message.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or SCells. In some aspects, the primary carrier may carry control information (e.g., downlink control information and/or scheduling information) for scheduling data communications on one or more secondary carriers, which may be referred to as cross-carrier scheduling. For example, the PCell may be used for initial access and to set up one or more SCells. In some aspects, a carrier (e.g., a primary carrier or a secondary carrier) may carry control information for scheduling data communications on the carrier, which may be referred to as self-carrier scheduling or carrier self-scheduling. Generally, SCells are used to provide additional bandwidth for data communication, while PCells are used for both data communication and control signaling.

The PCell may belong to a master cell group (MCG). The MCG may include a PCell and one or more SCells. A set of SCells may belong to a secondary cell group (SCG). The SCG may include a primary secondary cell (PSCell). The PSCell may be used for initial access and control signaling for the SCG. The PCell of the MCG and the PSCell of the SCG are collectively referred to as special cells (SPCells) for convenience, since many forms of signaling are mandated to occur on an SPCell (i.e., on a PCell or a PSCell). For example, the SPCell supports physical uplink control channel (PUCCH) transmission, contention based random access, and so on.

In some cases, a group of cells may be configured with a DRX configuration, such as a DRX configuration described in connection with FIG. 3. A group of cells with the same DRX configuration is referred to herein as a DRX group. Different groups of cells can be configured with different DRX configurations, which may be advantageous, for example, for groups of cells in different frequency ranges. The techniques and apparatuses described herein enable a WUS to be mapped to one or more groups of cells using higher-layer (e.g., RRC) signaling such that the WUS can cause the one or more groups of cells to enter an active time without modifying the content of the WUS.

As indicated above, FIG. 4 is provided as an example. Other examples may differ from what is described with regard to FIG. 4.

Figure 5:
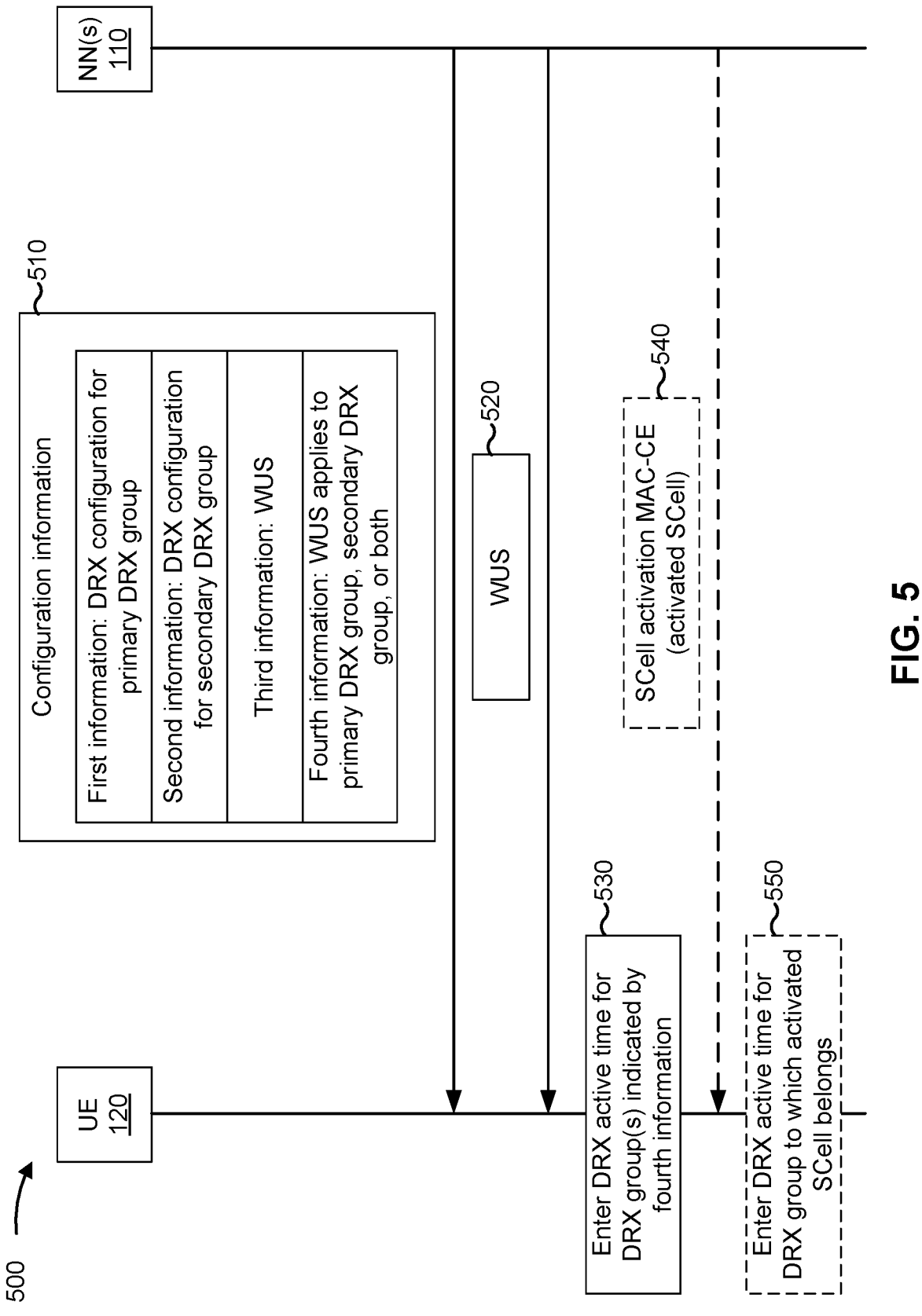
FIG. 5 is a diagram illustrating an example of mapping a wakeup signal (WUS) to one or more DRX groups, in accordance with the present disclosure.

FIG. 5 is a diagram illustrating an example 500 of mapping a WUS to one or more DRX groups, in accordance with the present disclosure. Example 500 includes a UE 120 and a network node 110.

As shown in FIG. 5, and by reference number 510, the network node 110 may transmit, and the UE 120 may receive, configuration information. The configuration information may be transmitted via RRC signaling, MAC signaling, DCI, system information (SI), or a combination thereof. In some aspects, the configuration information may be received in a single transmission. In some aspects, the configuration information may be received in multiple transmissions (e.g., a first part of the configuration information may be received in a first transmission and a second part of the configuration information may be received in a second transmission).

As shown, the configuration information may include first information. The first information may indicate a DRX configuration (sometimes referred to herein as a first DRX configuration) for a primary DRX group (sometimes referred to herein as a first DRX group or a first group of cells). In some aspects, the primary DRX group may be associated with a first frequency, such as a low-band frequency or a mid-band frequency (e.g., in FR1). The DRX configuration may include information indicating, for example, a DRX on duration, a DRX inactivity timer, a cycle start offset, a slot offset, or other information.

As further shown, the configuration information may include second information. The second information may indicate a DRX configuration (sometimes referred to herein as a second DRX configuration) for a secondary DRX group (sometimes referred to herein as a second DRX group or a second group of cells). In some aspects, the secondary DRX group may be associated with a second frequency, such as a high-band frequency (e.g., in FR2). The DRX configuration may include information indicating, for example, a DRX on duration, a DRX inactivity timer, a cycle start offset, a slot offset, or other information.

As further shown, the configuration information may include third information. The third information may configure a WUS. For example, the third information may indicate one or more parameters including a WUS occasion (e.g., a time resource, a frequency resource, a control resource set, a periodicity, etc.) associated with the WUS, a sequence associated with the WUS, a radio network temporary identifier associated with the WUS, or the like.

As further shown, the configuration information may include fourth information. The fourth information may include information indicating whether the WUS applies to the primary DRX group, the secondary DRX group, or both. For example, the fourth information may include a parameter (e.g., an RRC parameter WUSsecondaiy) with potential values {primary only, secondary only, both}. In some aspects, the network node 110 may transmit the fourth information (e.g., the parameter may be configured) when a WUS is configured and when multiple DRX groups can be configured. While the techniques described herein are described with regard to a first DRX group and a second DRX group, these techniques can be applied for any number of DRX groups.

As shown by reference number 520, the network node 110 may transmit, and the UE 120 may receive, a WUS. The network node 110 may transmit and the UE 120 may receive the WUS based at least in part on the third information. For example, the network node 110 may transmit and the UE 120 may receive the WUS using the one or more parameters indicated by the third information. In some aspects, the WUS may not include information indicating the DRX group to which the WUS applies. In some aspects, the network node 110 may trigger transmission of the WUS (such as by another network node 110). In some aspects, the network node 110 may transmit the WUS based at least in part on being triggered to transmit the WUS (such as by another network node 110).

As shown by reference number 530, the UE 120 may enter a DRX active time for the one or more DRX groups to which the WUS applies. For example, the UE 120 may enter a DRX active time for each cell included in a DRX group to which the WUS applies, in accordance with the fourth information. If the fourth information indicates that the WUS applies only to the primary DRX group, then each cell of the primary DRX group may enter a DRX active time. If the fourth information indicates that the WUS applies only to the secondary DRX group, then each cell of the secondary DRX group may enter a DRX active time. If the fourth information indicates that the WUS applies to both DRX groups, then each cell of the primary DRX group and the secondary DRX group may enter a DRX active time. In this way, the network node 110 and the UE 120 may use higher-layer signaling (e.g., the fourth information) to selectively associate one or more DRX groups with a WUS, which reduces impact on the content of the WUS and improves power conservation. "Enter a DRX active time," "wake up," and "awaken" are used interchangeably herein. Furthermore, starting a DRX inactivity timer for a cell causes the cell to enter a DRX active time.

In some aspects, the network node 110 may trigger one or more DRX groups to enter a DRX active time after the WUS has been transmitted. For example, consider a case where the fourth information maps the WUS to only the primary DRX group. If the network node 110 is to wake up the secondary DRX group, then the network node 110 may transmit an indication to wake up the secondary DRX group. For example, as shown by reference number 540, the network node 110 may transmit an SCell activation message (such as an SCell activation MAC-CE). The SCell activation message may indicate to activate an SCell belonging to the DRX group that the network node 110 is to wake up. For example, if the network node 110 is to wake up the secondary DRX group, the network node 110 may transmit an SCell activation message indicating to activate an SCell belonging to the secondary DRX group. The SCell may already be activated (e.g., available for data communication). The SCell activation message may be transmitted to an SCell other than the SCell identified by the SCell activation message. The UE 120 may start a DRX inactivity timer for the DRX group associated with the SCell. For example, if the UE 120 receives an SCell activation MAC-CE activating an SCell that is currently activated but not in a DRX active time, the UE 120 may start a DRX inactivity timer for the DRX group with which the SCell is associated. As shown by reference number 550, starting the DRX inactivity timer may cause the DRX group to be activated. The UE 120 may communicate using both DRX groups (not shown). Thus, the DRX group can be awakened prior to a next DRX on duration, which reduces latency and improves flexibility of DRX.

As indicated above, FIG. 5 is provided as an example. Other examples may differ from what is described with regard to FIG. 5.

Figure 6:
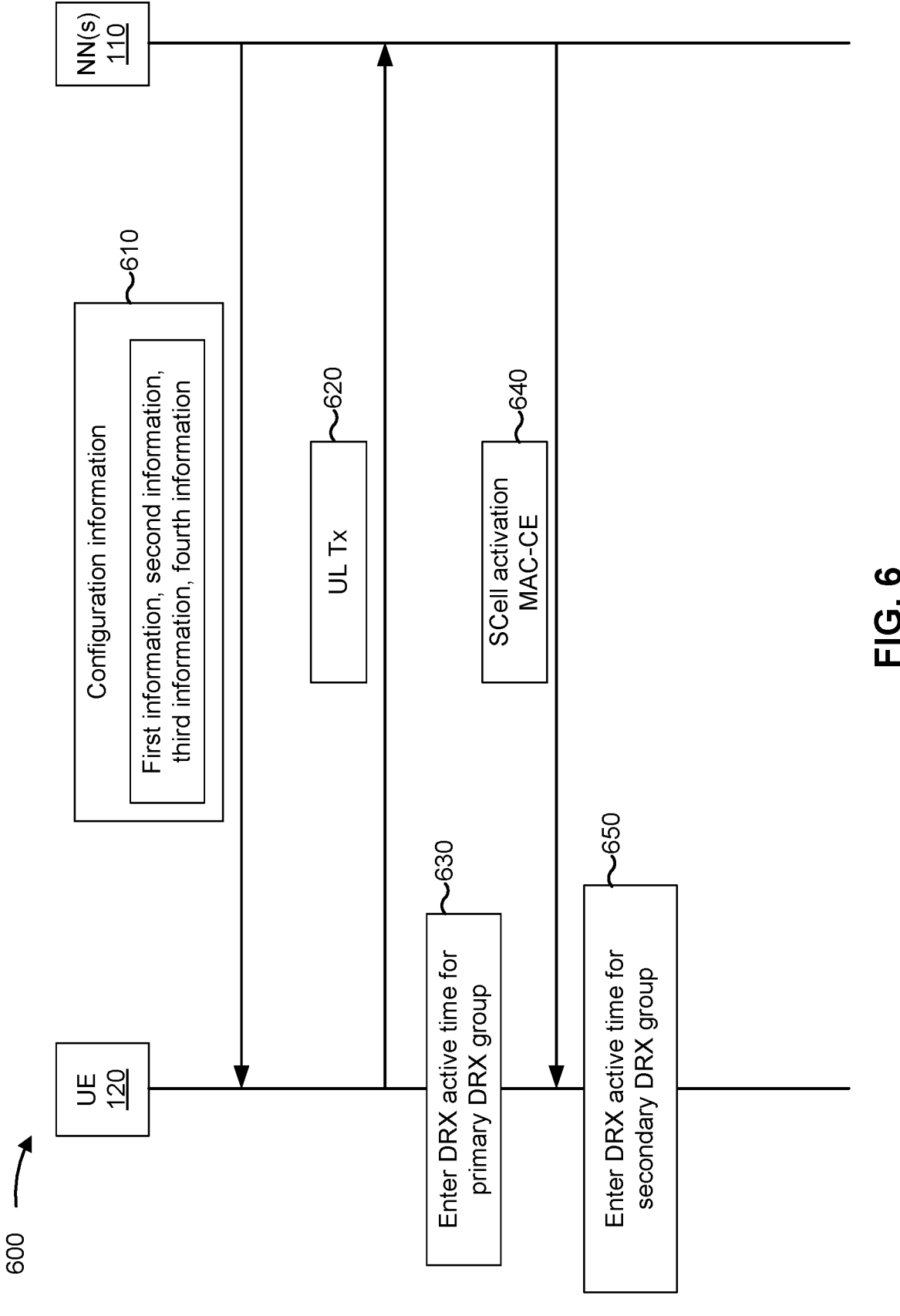
FIGS. 6 and 7 are diagrams illustrating examples of activating one or more DRX groups in association with an uplink transmission, in accordance with the present disclosure.
Figure 7:
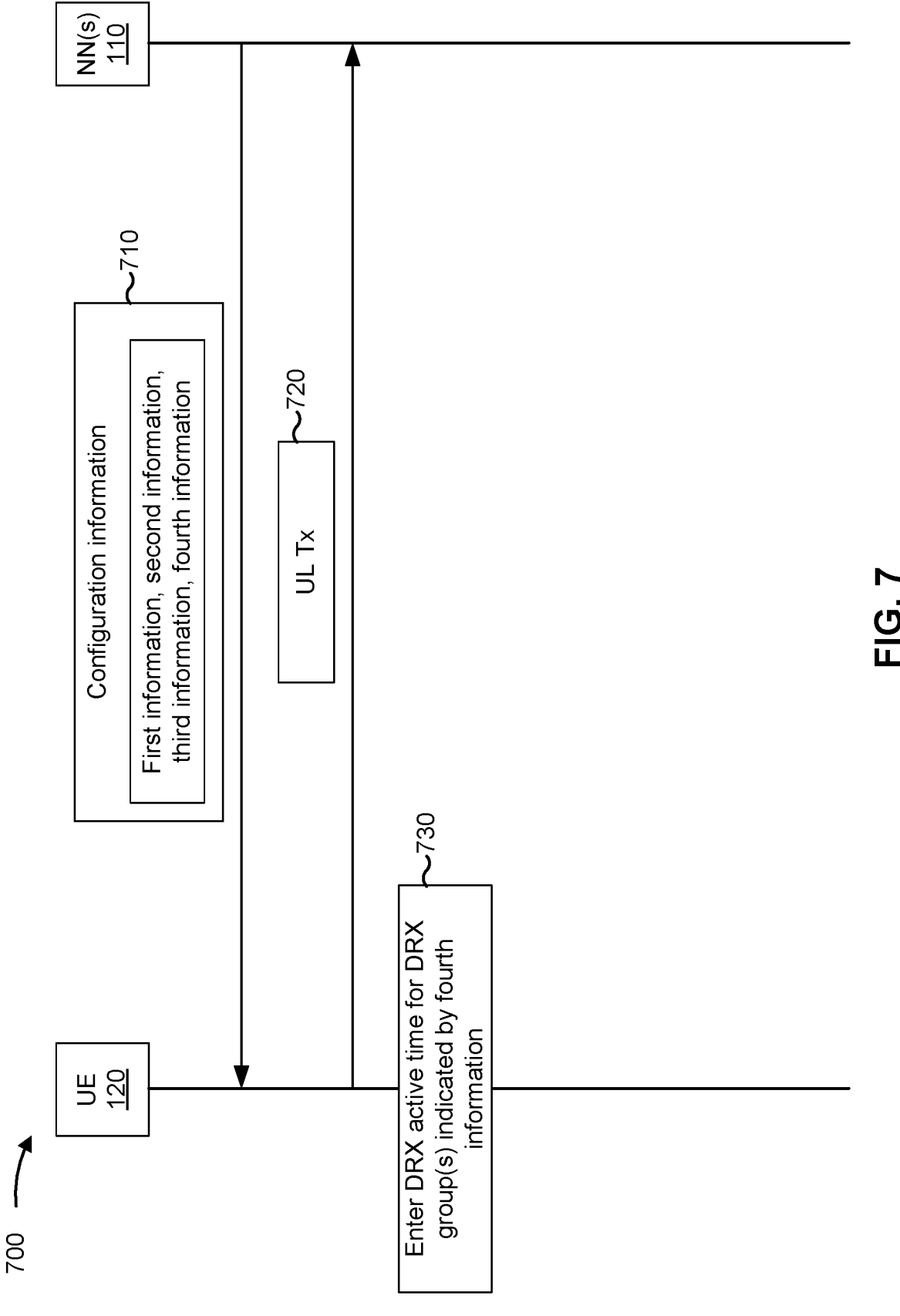

FIGS. 6 and 7 are diagrams illustrating examples 600 and 700 of activating one or more DRX groups in association with an uplink transmission, in accordance with the present disclosure. As shown, FIGS. 6 and 7 include a UE 120 and a network node 110.

As shown in FIG. 6, and by reference number 610, the UE 120 may receive configuration information. The configuration information may include the first information, the second information, the third information, and the fourth information described in connection with reference number 510 of FIG. 5.

As shown by reference number 620, the UE 120 may perform an uplink transmission. For example, the UE 120 may transmit a scheduling request, a RACH, or the like. In some aspects, the UE 120 may perform the uplink transmission during a DRX off duration of the primary DRX group and the secondary DRX group.

As shown by reference number 630, the UE 120 may enter a DRX active time for the primary DRX group (e.g., based at least in part on performing the uplink transmission). For example, the UE 120 may start a DRX inactivity timer for the primary DRX group. For example, the UE 120 may enter the DRX active time for one of the DRX groups configured for the UE 120. In some aspects, the UE 120 may enter the DRX active time for a DRX group associated with a particular frequency range, such as FR1. In some aspects, the UE 120 may enter the DRX active time for the DRX group on which the uplink transmission is performed. Thus, the UE 120 may awaken a group of cells for subsequent uplink or downlink communication after the uplink transmission.

As shown by reference number 640, the network node 110 may transmit (or trigger transmission of) signaling to awaken the secondary DRX group. For example, the network node 110 may determine that the secondary DRX group is to be transitioned to a DRX active time (e.g., based at least in part on an amount of data to be transmitted to the UE 120, based at least in part on a measurement associated with the primary DRX group, based at least in part on a buffer status report (BSR) reporting a threshold amount of uplink data, or the like). In some aspects, the signaling may include a WUS (e.g., if the fourth information maps the WUS to the secondary DRX group). In some aspects, the signaling may include an SCell activation message indicating to activate an already active SCell of the secondary DRX group (as described in connection with reference numbers 540 and 550 of FIG. 5). As shown by reference number 650, the UE 120 may enter the DRX active time for the secondary DRX group based at least in part on the signaling. For example, the UE 120 may start a DRX inactivity activity timer for the secondary DRX group based at least in part on the signaling. Thus, the network node 110 may use cross-group wakeup (e.g., the WUS or the SCell activation message) to wake up the secondary DRX group, which reduces latency and improves throughput.

As shown in FIG. 7, and by reference number 710, the UE 120 may receive configuration information. The configuration information may include the first information, the second information, the third information, and the fourth information described in connection with reference number 510 of FIG. 5.

As shown by reference number 720, the UE 120 may perform an uplink transmission. For example, the UE 120 may transmit a scheduling request, a RACH, or the like. In some aspects, the UE 120 may perform the uplink transmission during a DRX off duration of the primary DRX group and the secondary DRX group.

As shown by reference number 730, the UE 120 may enter a DRX active time for a set of DRX groups indicated by the fourth information (e.g., based at least in part on performing the uplink transmission). For example, the UE 120 may enter the DRX active time for each cell associated with a DRX group mapped to a WUS by the fourth information, which conserves signaling resources that would otherwise be used to transmit the WUS. Thus, the UE 120 may awaken a group of cells for subsequent uplink or downlink communication after the uplink transmission.

In some aspects (not shown), the network node 110 may transmit (or may trigger transmission of) signaling to awaken one or more DRX groups excluded from the set of DRX groups, such as an SCell activation message indicating to activate an already active SCell of the one or more DRX groups (as described in connection with reference numbers 540 and 550 of FIG. 5).

As indicated above, FIGS. 6 and 7 are provided as examples. Other examples may differ from what is described with regard to FIGS. 6 and 7.

FIG. 8 is a diagram illustrating an example process 800 performed, for example, by a UE, in accordance with the present disclosure. Example process 800 is an example where the UE (e.g., UE 120) performs operations associated with wakeup signaling for discontinuous reception groups.

As shown in FIG. 8, in some aspects, process 800 may include receiving first information indicating a first DRX configuration for a first group of cells and second information indicating a second DRX configuration for a second group of cells (block 810). For example, the UE (e.g., using communication manager 140 and/or reception component 1002, depicted in FIG. 10) may receive first information indicating a first DRX configuration for a first group of cells and second information indicating a second DRX configuration for a second group of cells, as described above.

As further shown in FIG. 8, in some aspects, process 800 may include receiving third information configuring a WUS for the UE (block 820). For example, the UE (e.g., using communication manager 140 and/or reception component 1002, depicted in FIG. 10) may receive third information configuring a WUS for the UE, as described above.

As further shown in FIG. 8, in some aspects, process 800 may include receiving fourth information indicating that the WUS applies to a set of groups of cells selected from the first group of cells and the second group of cells (block 830). For example, the UE (e.g., using communication manager 140 and/or reception component 1002, depicted in FIG. 10) may receive fourth information indicating that the WUS applies to a set of groups of cells selected from the first group of cells and the second group of cells, as described above.

As further shown in FIG. 8, in some aspects, process 800 may include receiving the WUS based at least in part on the third information (block 840). For example, the UE (e.g., using communication manager 140 and/or reception component 1002, depicted in FIG. 10) may receive the WUS based at least in part on the third information, as described above.

Process 800 may include additional aspects, such as any single aspect or any combination of aspects described below and/or in connection with one or more other processes described elsewhere herein.

Figure 10:
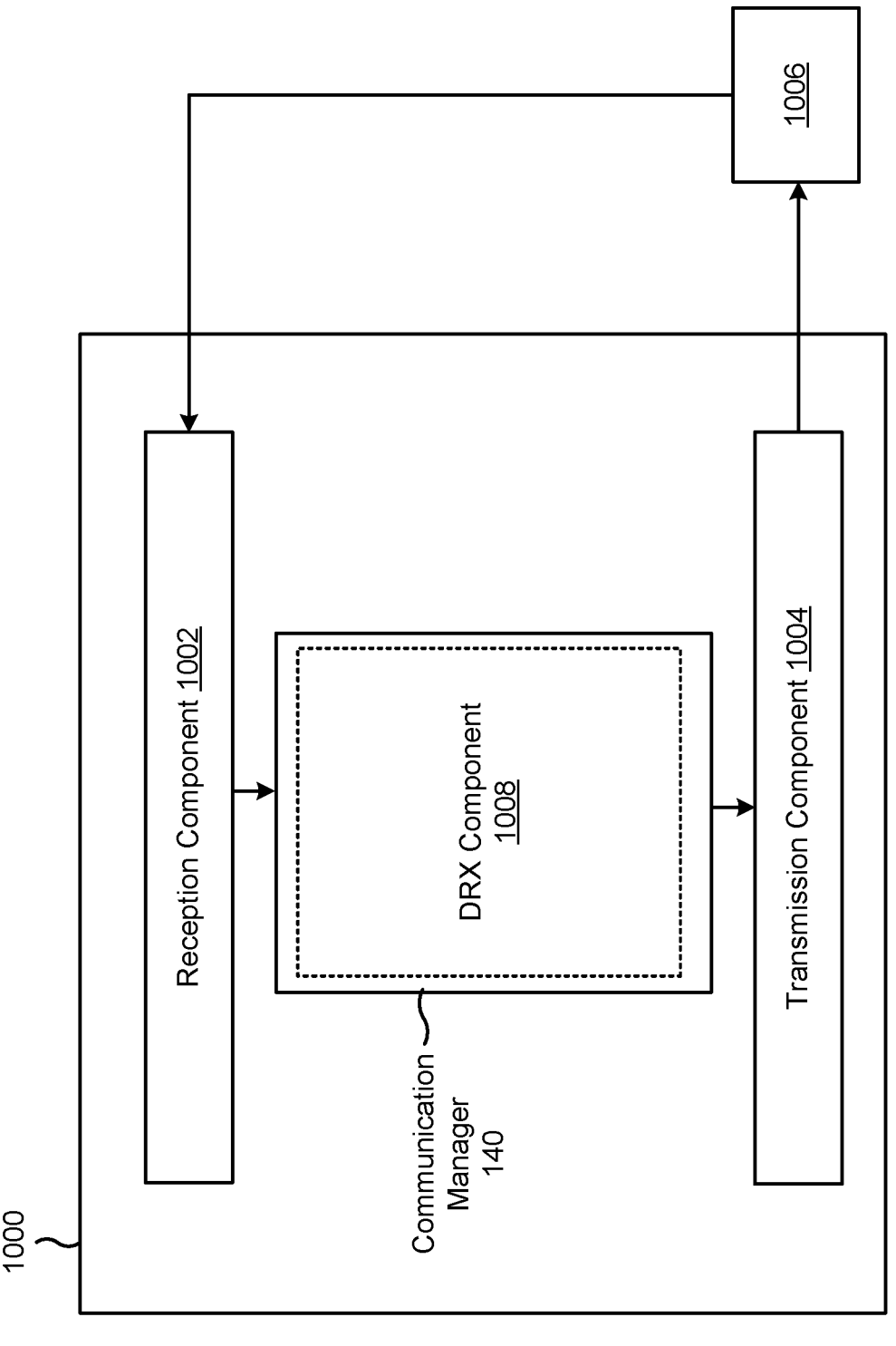
FIGS. 10 and 11 are diagrams of example apparatuses for wireless communication, in accordance with the present disclosure.

In a first aspect, process 800 includes (e.g., using communication manager 140 and/or DRX component 1008, depicted in FIG. 10) entering a DRX active time for the set of groups of cells based at least in part on the WUS.

In a second aspect, alone or in combination with the first aspect, the set of groups of cells include only one group of cells of the first group of cells and the second group of cells.

In a third aspect, alone or in combination with one or more of the first and second aspects, the set of groups of cells include the first group of cells and the second group of cells.

In a fourth aspect, alone or in combination with one or more of the first through third aspects, the WUS is received on a special cell of the first group of cells and the second group of cells, and wherein the special cell is not in the DRX active time when the WUS is received.

In a fifth aspect, alone or in combination with one or more of the first through fourth aspects, process 800 includes receiving an SCell activation message indicating an activated SCell that is outside of a DRX active time, and starting a DRX inactivity timer for a group of cells, of the first group of cells and the second group of cells, with which the activated SCell is associated.

In a sixth aspect, alone or in combination with one or more of the first through fifth aspects, process 800 includes performing an uplink transmission; and entering a DRX active time for the first group of cells using one or more cells of the first group of cells, wherein the set of groups of cells to which the WUS applies include only the second group of cells.

In a seventh aspect, alone or in combination with one or more of the first through sixth aspects, process 800 includes performing an uplink transmission; and entering a DRX active time for the set of groups of cells.

In an eighth aspect, alone or in combination with one or more of the first through seventh aspects, the information indicating that the WUS applies to the set of groups of cells is received via a radio resource control parameter.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a network node, in accordance with the present disclosure. Example process 900 is an example where the network node (e.g., network node 110) performs operations associated with wakeup signaling for discontinuous reception groups.

As shown in FIG. 9, in some aspects, process 900 may include transmitting, to a UE, first information indicating a first DRX configuration for a first group of cells and second information indicating a second DRX configuration for a second group of cells (block 910). For example, the network node (e.g., using communication manager 150 and/or transmission component 1104 or configuration component 1108, depicted in FIG. 11) may transmit, to a UE, first information indicating a first DRX configuration for a first group of cells and second information indicating a second DRX configuration for a second group of cells, as described above.

As further shown in FIG. 9, in some aspects, process 900 may include transmitting third information configuring a WUS for the UE (block 920). For example, the network node (e.g., using communication manager 150 and/or transmission component 1104 or configuration component 1108, depicted in FIG. 11) may transmit third information configuring a WUS for the UE, as described above.

As further shown in FIG. 9, in some aspects, process 900 may include transmitting fourth information indicating that the WUS applies to a set of groups of cells selected from the first group of cells and the second group of cells (block 930). For example, the network node (e.g., using communication manager 150 and/or transmission component 1104 or configuration component 1108, depicted in FIG. 11) may transmit fourth information indicating that the WUS applies to a set of groups of cells selected from the first group of cells and the second group of cells, as described above.

As further shown in FIG. 9, in some aspects, process 900 may include triggering the WUS based at least in part on the third information (block 940). For example, the network node (e.g., using communication manager 150 and/or transmission component 1104 or configuration component 1108, depicted in FIG. 11) may transmit, or may trigger transmission of, the WUS based at least in part on the third information, as described above.

Process 900 may include additional aspects, such as any single aspect or any combination of aspects described below and/or in connection with one or more other processes described elsewhere herein.

In a first aspect, the set of groups of cells include only one group of cells of the first group of cells and the second group of cells.

In a second aspect, alone or in combination with the first aspect, the set of groups of cells include the first group of cells and the second group of cells.

In a third aspect, alone or in combination with one or more of the first and second aspects, the WUS is transmitted on a special cell of the first group of cells and the second group of cells, and wherein the special cell is not in a DRX active time when the WUS is received.

In a fourth aspect, alone or in combination with one or more of the first through third aspects, process 900 includes transmitting an SCell activation message on an activated SCell, and starting a DRX inactivity timer for a group of cells, of the first group of cells and the second group of cells, with which the activated SCell is associated.

In a fifth aspect, alone or in combination with one or more of the first through fourth aspects, process 900 includes receiving an uplink transmission using one or more cells of the first group of cells, wherein the set of groups of cells to which the WUS applies include only the second group of cells, and transmitting the WUS based at least in part on receiving the uplink transmission.

In a sixth aspect, alone or in combination with one or more of the first through fifth aspects, process 900 includes receiving an uplink transmission using one or more cells of the set of groups of cells.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include the communication manager 140. The communication manager 140 may include a DRX component 1008, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive first information indicating a first DRX configuration for a first group of cells and second information indicating a second DRX configuration for a second group of cells. The reception component 1002 may receive third information configuring a WUS for the UE. The reception component 1002 may receive fourth information indicating that the WUS applies to a set of groups of cells selected from the first group of cells and the second group of cells. The reception component 1002 may receive the WUS based at least in part on the third information.

The DRX component 1008 may enter a DRX active time for the set of groups of cells based at least in part on the WUS.

The reception component 1002 may receive an SCell activation message on an activated SCell.

The DRX component 1008 may start a DRX inactivity timer for a group of cells, of the first group of cells and the second group of cells, with which the activated SCell is associated.

The DRX component 1008 may enter a DRX active time for the first group of cells prior to receiving the WUS.

The transmission component 1004 may perform an uplink transmission using one or more cells of the first group of cells, wherein the set of groups of cells to which the WUS applies include only the second group of cells.

The DRX component 1008 may enter a DRX active time for the set of groups of cells prior to receiving the WUS.

The transmission component 1004 may perform an uplink transmission using one or more cells of the set of groups of cells.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
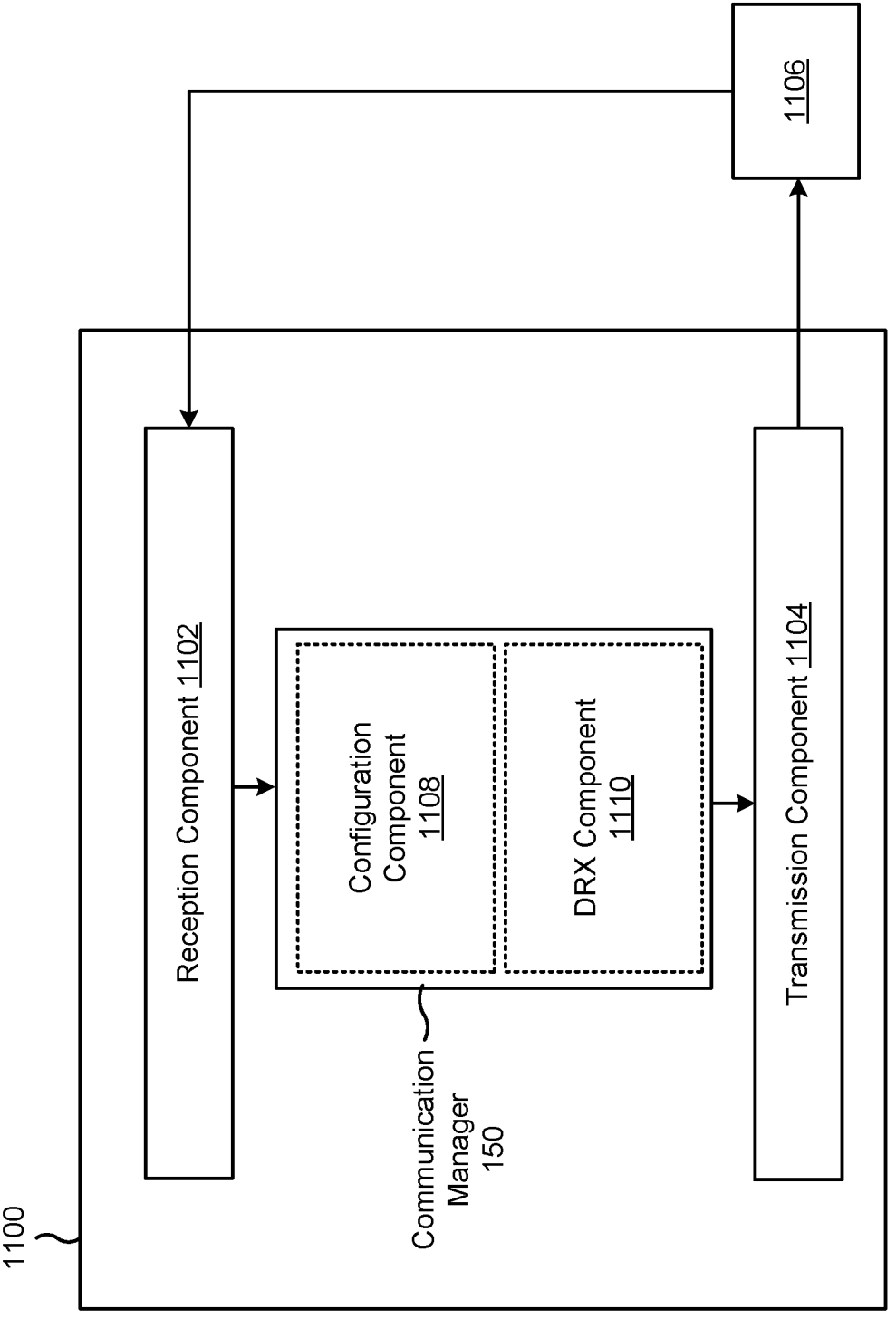

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a network node, or another wireless communication device) using the reception component 1102 and the transmission component 1104. As further shown, the apparatus 1100 may include the communication manager 150. The communication manager 150 may include a configuration component 1108 or a DRX component 1110, among other examples.

In some aspects, the apparatus 1100 may be configured to perform one or more operations described herein in connection with FIGS. 3-7. Additionally, or alternatively, the apparatus 1100 may be configured to perform one or more processes described herein, such as process 900 of FIG. 9, process 1200 of FIG. 12, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit, to a UE first information indicating a first DRX configuration for a first group of cells and second information indicating a second DRX configuration for a second group of cells. The transmission component 1104 may transmit third information configuring a WUS for the UE. The transmission component 1104 may transmit fourth information indicating that the WUS applies to a set of groups of cells selected from the first group of cells and the second group of cells. The transmission component 1104 may transmit or trigger transmission of the WUS based at least in part on the third information.

The transmission component 1104 may transmit an SCell activation message on an activated SCell.

The DRX component 1110 may start a DRX inactivity timer for a group of cells, of the first group of cells and the second group of cells, with which the activated SCell is associated.

The reception component 1102 may receive an uplink transmission using one or more cells of the first group of cells, wherein the set of groups of cells to which the WUS applies include only the second group of cells.

The transmission component 1104 may transmit the WUS based at least in part on receiving the uplink transmission.

The reception component 1102 may receive an uplink transmission using one or more cells of the set of groups of cells.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

FIG. 12 is a diagram illustrating an example process 1200 performed, for example, by a UE, in accordance with the present disclosure. Example process 1200 is an example where the UE (e.g., UE 120) performs operations associated with techniques for wakeup signaling for discontinuous reception groups.

As shown in FIG. 12, in some aspects, process 1200 may include receiving first information indicating a first DRX configuration for a first group of cells and second information indicating a second DRX configuration for a second group of cells (block 1210). For example, the UE (e.g., using communication manager 140 and/or reception component 1102, depicted in FIG. 11) may receive first information indicating a first DRX configuration for a first group of cells and second information indicating a second DRX configuration for a second group of cells, as described above.

As further shown in FIG. 12, in some aspects, process 1200 may include receiving an SCell activation message indicating an activated SCell that is outside of a DRX active time (block 1220). For example, the UE (e.g., using communication manager 140 and/or reception component 1002, depicted in FIG. 11) may receive an SCell activation message indicating an activated SCell that is outside of a DRX active time, as described above.

As further shown in FIG. 12, in some aspects, process 1200 may include starting a DRX inactivity timer for a particular group of cells, of the first group of cells and the second group of cells, with which the activated SCell is associated (block 1230). For example, the UE (e.g., using communication manager 140 and/or DRX component 1008, depicted in FIG. 10) may start a DRX inactivity timer for a particular group of cells, of the first group of cells and the second group of cells, with which the activated SCell is associated, as described above.

Process 1200 may include additional aspects, such as any single aspect or any combination of aspects described below and/or in connection with one or more other processes described elsewhere herein.

In a first aspect, the SCell activation message is received on a cell that is in a DRX active time.

In a second aspect, alone or in combination with the first aspect, process 1200 includes receiving, prior to receiving the SCell activation message, fourth information indicating that a WUS applies to a set of groups of cells selected from the first group of cells and the second group of cells, wherein the particular group of cells is not included in the set of groups of cells, and receiving, prior to receiving the SCell activation message, a WUS.

In a third aspect, alone or in combination with one or more of the first and second aspects, process 1200 includes entering, prior to receiving the SCell activation message, a DRX active time for the set of groups of cells.

In a fourth aspect, alone or in combination with one or more of the first through third aspects, the SCell activation message is an SCell activation medium access control control element.

In a fifth aspect, alone or in combination with one or more of the first through fourth aspects, process 1200 includes receiving fourth information indicating that a WUS applies to a set of groups of cells selected from the first group of cells and the second group of cells, performing an uplink transmission on a cell included in the first group of cells, and entering a DRX active time for only the first group of cells, wherein the set of groups of cells includes at least the second group of cells.

In a sixth aspect, alone or in combination with one or more of the first through fifth aspects, process 1200 includes receiving fourth information indicating that the WUS applies to a set of groups of cells selected from the first group of cells and the second group of cells, performing an uplink transmission, and entering a DRX active time for the set of groups of cells.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The following provides an overview of some Aspects of the present disclosure:

Aspect 1: A method of wireless communication performed by a user equipment (UE), comprising: receiving first information indicating a first discontinuous reception (DRX) configuration for a first group of cells and second information indicating a second DRX configuration for a second group of cells; receiving third information configuring a wakeup signal (WUS) for the UE; receiving fourth information indicating that the WUS applies to a set of groups of cells selected from the first group of cells and the second group of cells; and receiving the WUS based at least in part on the third information.

Aspect 2: The method of Aspect 1, further comprising: entering a DRX active time for the set of groups of cells based at least in part on the WUS.

Aspect 3: The method of any of Aspects 1-2, wherein the set of groups of cells include only one group of cells of the first group of cells and the second group of cells.

Aspect 4: The method of any of Aspects 1-3, wherein the set of groups of cells include the first group of cells and the second group of cells.

Aspect 5: The method of any of Aspects 1-4, wherein the WUS is received on a special cell of the first group of cells and the second group of cells, and wherein the special cell is not in the DRX active time when the WUS is received.

Aspect 6: The method of any of Aspects 1-5, further comprising: receiving a secondary cell (SCell) activation message on an activated SCell; and starting a DRX inactivity timer for a group of cells, of the first group of cells and the second group of cells, with which the activated SCell is associated.

Aspect 7: The method of any of Aspects 1-6, further comprising: entering a DRX active time for the first group of cells prior to receiving the WUS; and performing an uplink transmission using one or more cells of the first group of cells, wherein the set of groups of cells to which the WUS applies include only the second group of cells.

Aspect 8: The method of any of Aspects 1-7, further comprising: entering a DRX active time for the set of groups of cells prior to receiving the WUS; and performing an uplink transmission using one or more cells of the set of groups of cells.

Aspect 9: The method of Aspect 8, wherein the information indicating that the WUS applies to the set of groups of cells is received via a radio resource control parameter.

Aspect 10: A method of wireless communication performed by a network node, comprising: transmitting, to a user equipment (UE) first information indicating a first discontinuous reception (DRX) configuration for a first group of cells and second information indicating a second DRX configuration for a second group of cells; transmitting third information configuring a wakeup signal (WUS) for the UE; transmitting fourth information indicating that the WUS applies to a set of groups of cells selected from the first group of cells and the second group of cells; and transmitting the WUS based at least in part on the third information.

Aspect 11: The method of Aspect 10, wherein the set of groups of cells include only one group of cells of the first group of cells and the second group of cells.

Aspect 12: The method of any of Aspects 10-11, wherein the set of groups of cells include the first group of cells and the second group of cells.

Aspect 13: The method of any of Aspects 10-12, wherein the WUS is transmitted on a special cell of the first group of cells and the second group of cells, and wherein the special cell is not in a DRX active time when the WUS is received.

Aspect 14: The method of any of Aspects 10-13, further comprising: transmitting a secondary cell (SCell) activation message on an activated SCell; and starting a DRX inactivity timer for a group of cells, of the first group of cells and the second group of cells, with which the activated SCell is associated.

Aspect 15: The method of any of Aspects 10-14, further comprising: receiving an uplink transmission using one or more cells of the first group of cells, wherein the set of groups of cells to which the WUS applies include only the second group of cells; and transmitting the WUS based at least in part on receiving the uplink transmission.

Aspect 16: The method of any of Aspects 10-15, further comprising: receiving an uplink transmission using one or more cells of the set of groups of cells.

Aspect 17: A method of wireless communication performed by a user equipment (UE), comprising: receiving first information indicating a first discontinuous reception (DRX) configuration for a first group of cells and second information indicating a second DRX configuration for a second group of cells; receiving a secondary cell (SCell) activation message indicating an activated SCell that is outside of a DRX active time; and starting a DRX inactivity timer for a particular group of cells, of the first group of cells and the second group of cells, with which the activated SCell is associated.

Aspect 18: The method of aspect 17, wherein the SCell activation message is received on a cell that is in a DRX active time.

Aspect 19: The method of any of aspects 17-18, further comprising: receiving, prior to receiving the SCell activation message, fourth information indicating that a WUS applies to a set of groups of cells selected from the first group of cells and the second group of cells, wherein the particular group of cells is not included in the set of groups of cells; and receiving, prior to receiving the SCell activation message, a WUS.

Aspect 20: The method of aspect 19, further comprising: entering, prior to receiving the SCell activation message, a DRX active time for the set of groups of cells.

Aspect 21: The method of any of aspects 17-20, wherein the SCell activation message is an SCell activation medium access control control element.

Aspect 22: The method of any of aspects 17-21, further comprising: receiving fourth information indicating that a WUS applies to a set of groups of cells selected from the first group of cells and the second group of cells; performing an uplink transmission on a cell included in the first group of cells; and entering a DRX active time for only the first group of cells, wherein the set of groups of cells includes at least the second group of cells.

Aspect 23: The method of any of aspects 17-22, further comprising: receiving fourth information indicating that the WUS applies to a set of groups of cells selected from the first group of cells and the second group of cells; performing an uplink transmission; and entering a DRX active time for the set of groups of cells.

Aspect 24: An apparatus for wireless communication at a device, comprising a processor; memory coupled with the processor; and instructions stored in the memory and executable by the processor to cause the apparatus to perform the method of one or more of Aspects 1-23.

Aspect 25: A device for wireless communication, comprising a memory and one or more processors coupled to the memory, the one or more processors configured to perform the method of one or more of Aspects 1-23.

Aspect 26: An apparatus for wireless communication, comprising at least one means for performing the method of one or more of Aspects 1-23.

Aspect 27: A non-transitory computer-readable medium storing code for wireless communication, the code comprising instructions executable by a processor to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

receive first information indicating a first discontinuous reception (DRX) configuration for a first group of cells and second information indicating a second DRX configuration for a second group of cells;

receive third information configuring a wakeup signal (WUS) for the UE;

receive, via radio resource control (RRC), fourth information indicating that the WUS applies to a set of groups of cells selected from the first group of cells and the second group of cells; and receive the WUS based at least in part on the third information.

2. The apparatus of claim 1, wherein the one or more processors are further configured to:

enter a DRX active time for the set of groups of cells based at least in part on the WUS.

3. The apparatus of claim 1,
wherein the set of groups of cells include only one group
of cells of the first group of cells and the second group
of cells.

4. The apparatus of claim 1,
wherein the set of groups of cells include the first group
of cells and the second group of cells.

5. The apparatus of claim 1,
wherein the WUS is received on a special cell of the first
group of cells and the second group of cells, and
wherein the special cell is not in a DRX active time
when the WUS is received.

6. The apparatus of claim 1,
wherein the one or more processors are further configured
to:
   receive a secondary cell (SCell) activation message on
an activated SCell; and
   start a DRX inactivity timer for a group of cells, of the
first group of cells and the second group of cells,
with which the activated SCell is associated.

7. The apparatus of claim 1,
wherein the one or more processors are further configured
to:
   enter a DRX active time for the first group of cells prior
to receiving the WUS; and
   perform an uplink transmission using one or more cells
of the first group of cells, wherein the set of groups
of cells to which the WUS applies include only the
second group of cells.

8. The apparatus of claim 1,
wherein the one or more processors are further configured
to:
   enter a DRX active time for the set of groups of cells
prior to receiving the WUS; and
   perform an uplink transmission using one or more cells
of the set of groups of cells.

9. An apparatus for wireless communication at a base
station, comprising:
one or more memories; and
one or more processors, coupled to the one or more
memories, configured to:
   transmit, to a user equipment (UE) first information
indicating a first discontinuous reception (DRX)
configuration for a first group of cells and second
information indicating a second DRX configuration
for a second group of cells;
   transmit third information configuring a wakeup signal
(WUS) for the UE;
   transmit, via radio resource control (RRC), fourth
information indicating that the WUS applies to a set
of groups of cells selected from the first group of
cells and the second group of cells; and
   trigger the WUS based at least in part on the third
information.

10. The apparatus of claim 9, wherein, to trigger the
WUS, the one or more processors are further configured to
transmit the WUS.

11. The apparatus of claim 9,
wherein the set of groups of cells include only one group
of cells of the first group of cells and the second group
of cells.

12. The apparatus of claim 9,
wherein the set of groups of cells include the first group
of cells and the second group of cells.

13. The apparatus of claim 9,
wherein the WUS is transmitted on a special cell of the
first group of cells and the second group of cells, and wherein the special cell is not in a DRX active time
when the WUS is received.

14. The apparatus of claim 9,
wherein the one or more processors are further configured
to:
   transmit a secondary cell (SCell) activation message on
an activated SCell; and
   start a DRX inactivity timer for a group of cells, of the
first group of cells and the second group of cells,
with which the activated SCell is associated.

15. The apparatus of claim 9,
wherein the one or more processors are further configured
to:
   receive an uplink transmission using one or more cells
of the first group of cells, wherein the set of groups
of cells to which the WUS applies include only the
second group of cells; and
   transmit the WUS based at least in part on receiving the
uplink transmission.

16. The apparatus of claim 9,
wherein the one or more processors are further configured
to:
   receive an uplink transmission using one or more cells
of the set of groups of cells.

17. An apparatus for wireless communication at a user
equipment (UE), comprising:
one or more memories; and
one or more processors, coupled to the one or more
memories, configured to:
   receive first information indicating a first discontinuous
reception (DRX) configuration for a first group of
cells and second information indicating a second
DRX configuration for a second group of cells;
   receive, in a secondary cell (SCell) activation medium
access control control element, an SCell activation
message indicating an activated SCell that is outside
of a DRX active time; and
   start a DRX inactivity timer for a particular group of
cells, of the first group of cells and the second group
of cells, with which the activated SCell is associated.

18. The apparatus of claim 17,
wherein the SCell activation message is received on a cell
that is in a DRX active time.

19. The apparatus of claim 17,
wherein the one or more processors are further configured
to:
   receive, prior to receiving the SCell activation message,
fourth information indicating that a wakeup signal
applies to a set of groups of cells selected from the
first group of cells and the second group of cells,
wherein the particular group of cells is not included
in the set of groups of cells; and
   receive, prior to receiving the SCell activation message,
a WUS.

20. The apparatus of claim 19,
wherein the one or more processors are further configured
to:
   enter, prior to receiving the SCell activation message,
a DRX active time for the set of groups of cells.

21. The apparatus of claim 17,
wherein the one or more processors are further configured
to:
   receive fourth information indicating that a wakeup
signal applies to a set of groups of cells selected from
the first group of cells and the second group of cells;
   perform an uplink transmission on a cell included in the
first group of cells; and enter a DRX active time for only the first group of cells, wherein the set of groups of cells includes at least the second group of cells.

22. The apparatus of claim 17, wherein the one or more processors are further configured to:

receive fourth information indicating that a wakeup signal applies to a set of groups of cells selected from the first group of cells and the second group of cells;

perform an uplink transmission; and enter a DRX active time for the set of groups of cells.

23. A method of wireless communication performed by a user equipment (UE), comprising:

receiving first information indicating a first discontinuous reception (DRX) configuration for a first group of cells and second information indicating a second DRX configuration for a second group of cells;

receiving third information configuring a wakeup signal (WUS) for the UE;

receiving fourth information, via radio resource control (RRC), indicating that the WUS applies to a set of groups of cells selected from the first group of cells and the second group of cells; and receiving the WUS based at least in part on the third information.

24. The method of claim 23, further comprising:

entering a DRX active time for the set of groups of cells based at least in part on the WUS.

25. The method of claim 23, wherein the set of groups of cells include only one group of cells of the first group of cells and the second group of cells.

26. The method of claim 23, wherein the set of groups of cells include the first group of cells and the second group of cells.

27. The method of claim 23, wherein the WUS is received on a special cell of the first group of cells and the second group of cells, and wherein the special cell is not in a DRX active time when the WUS is received.

28. The method of claim 23, further comprising:

receiving a secondary cell (SCell) activation message indicating an activated SCell that is outside of a DRX active time; and starting a DRX inactivity timer for a group of cells, of the first group of cells and the second group of cells, with which the activated SCell is associated.

29. The method of claim 23, further comprising, entering a DRX active time for the first group of cells prior to receiving the WUS; and performing an uplink transmission using one or more cells of the first group of cells, wherein the set of groups of cells to which the WUS applies include only the second group of cells.

30. The method of claim 23, further comprising:

entering a DRX active time for the set of groups of cells prior to receiving the WUS; and performing an uplink transmission using one or more cells of the set of groups of cells.

* * * * *